Nov. 9, 1926.                    1,606,551
J. S. WILLIAMS
PACKLESS GLAND
Filed July 2, 1926
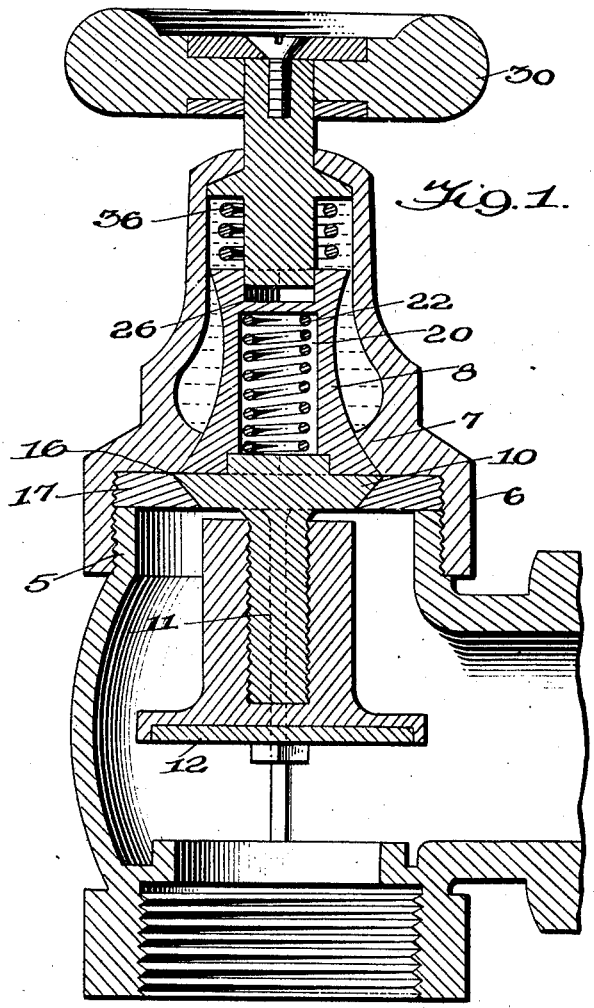
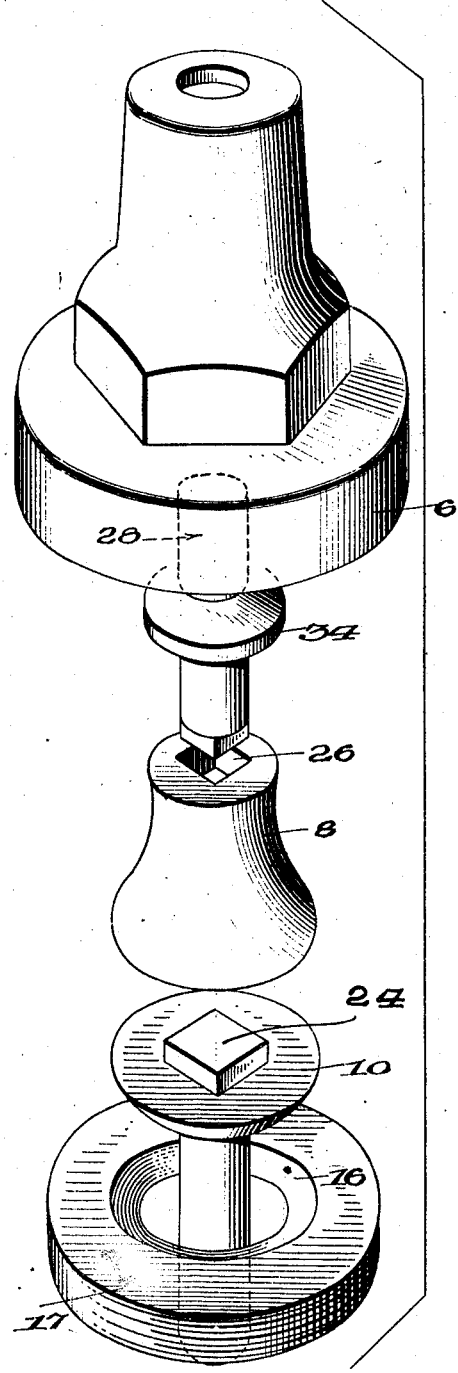
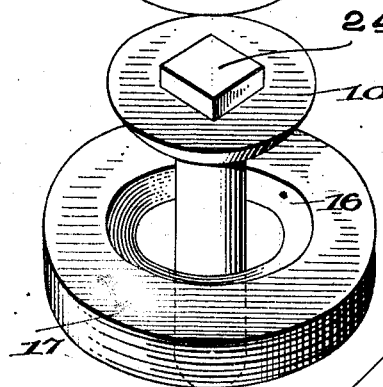
Inventor
J. S. WILLIAMS,
By Eugene E. Stevens
Attorney Patented Nov. 9, 1926.

1,606,551

UNITED STATES PATENT OFFICE.

JOSEPH S. WILLIAMS, OF HARRISBURG, PENNSYLVANIA.

PACKLESS GLAND.

Application filed July 2, 1926. Serial No. 120,178.

This invention relates to glands especially adapted for use in connection with high and low pressure valves, vacuum systems, bibs, faucets, cocks, or other devices especially adapted for use in controlling fluid.

Briefly stated, an important object of the invention is to provide a gland having means to overcome the need of employing the packing common on present day valves and which when once installed will not require periodical renewal and frequent repair.

A further and equally important object is to provide a gland of the character specified which is of highly simplified construction, durable in use, and cheap to manufacture.

Other objects and advantages will be apparent during the course of the following description.

In the accompanying drawing forming a part of this application and in which like numerals are employed to designate like parts throughout the same, Figure 1 is a vertical sectional view through a gland applied to a valve;

Figure 2 is a group perspective of the means by which the gland is rendered fluid tight.

Figure 3 is a detail horizontal section through the valve.

In the drawing, the numeral 5 designates a valve casing although it is to be understood at this point that the invention is not in any way restricted to use in connection with a valve of the type illustrated.

Figure 1 clearly illustrates that a bonnet 6 is threaded onto the casing 5 and is internally reduced to define an internal seat 7 for engagement by the adjacent portion of the outwardly flared spool-like body 8. The flared lower end of the spool-shaped body 8 is flatly engaged by the head 10 of a threaded stem 11, which, as illustrated in Figure 1, is provided with a valve 12 adapted to be engaged with a seat to cooperate with the seat in controlling the passage of fluid through the valve.

In carrying out the invention, the outer edge of the head 10 is beveled and is engaged with the internal seat 16 of a ring 17 threaded into the attaching portion of the bonnet 6, all of which is clearly shown in Figure 1.

The head 10 has a ground fit with the internal beveled seat 10 and is capable of turning thereon so that the valve 12 may be raised or lowered as the occasion requires. The ring 17 in addition to forming a seat for the head 10 acts as a retaining means for the head 10 and the spool-shaped body 8. By tightening or loosening the retaining ring 17, the contact between the parts 8 and 7 and the parts 10 and 16 may be varied.

The spool-like body 8 is provided with a longitudinal socket 20 for the reception of a spring 22. The lower end of the spring is engaged with the squared boss 24 on the upper surface of the head 10 and the upper end of the spring is engaged with the upper end of the socket 20 whereby the spool-like member is urged upwardly into liquid tight contact with the seat 7 and the head 10 is urged downwardly into fluid tight contact with the ring 17.

The upper portion of the spool-shaped body 8 is provided with a squared socket 26 to receive the squared lower end of an operating stem 28, the upper of which extends exteriorly of the bonnet and is provided with a handle 30 or other operating mechanism such as a lever. The intermediate portion of the operating stem 28 is provided with an annular shoulder 34, the upper surface of which is beveled and has ground contact with the upper portion of the bonnet whereby a liquid tight seal is established between these parts. Figure 1 clearly illustrates that a spring 36 is confined between the upper end of the spool-shaped body 8 and the under side of the annular shoulder 34 to urge the shoulder upwardly into fluid tight contact with the adjacent portion of the bonnet.

Figure 1 clearly illustrates that the lower portion of the operating stem 28 is squared and is extended into the squared socket 26 to established a driving contact between these parts. It will be observed by further reference to Figure 1 that a limited movement is permitted between the parts 8 and 28 to compensate for wear and to permit the springs to urge the various closures into fluid tight contact with their respective seats.

In initially assembling the valve gland, a quantity of fluid is placed in the bonnet and the spool-like body 8 is then introduced into the bonnet so as to urge the spring 36 tightly into engagement with the annular shoulder 34. The head 10 is now positioned as shown in Figure 1 and the ring 17 is applied to hold the head 10 firmly in place and to define a seat for the same. The liquid within the bonnet will provide an absolutely fluid tight seal by which the fluid which passes through the casing 5 is prevented from leaking about the operating stem of the valve.

A gland constructed in accordance with this invention is capable of use in connection with any device that controls high or low pressure systems, vacuum systems, valves such as globe valves, gate valves, needle valves, flap valves, throttle valves, cylinder valves, butterfly valves, check valves, faucets, cocks, and bibs. Once the liquid has been introduced into the chamber in the bonnet it will not escape by evaporation or otherwise and will require no renewal.

Having thus described the invention, what is claimed is:

1. A gland comprising a bonnet having an internal shoulder provided with a seat, a spool-shaped body having the lower end thereof flared and having a ground fit with said seat, a valve stem having a head engaging said spool-shaped body and having the periphery thereof beveled, a combined retainer and seat for said head, said combined retainer and seat being threaded into the lower portion of said bonnet, said spool-shaped body being provided with a socket, and a spring in said socket and urging said spool-shaped body into fluid tight contact with said combined shoulder and seat and urging said head into fluid tight contact with said combined retainer and seat, said head being provided with a boss having flat sides, said spool-shaped body having the lower end thereof provided with flat surfaces engaged by the flat surfaces of said boss.

2. A gland comprising a bonnet having an internal shoulder provided with a seat, a spool-shaped body having the lower end thereof flared and having a ground fit with said seat, a valve stem having a head engaging said spool-shaped body and having the periphery thereof beveled, a combined retainer and seat for said head, said combined retainer and seat being threaded into the lower portion of said bonnet, said spool-shaped body being provided with a socket, a spring in said socket and urging said spool-shaped body into fluid tight contact with said combined shoulder and seat and urging said head into fluid tight contact with said combined retainer and seat, and an operating member having a stem extending through the top of said bonnet and having an annular shoulder provided with a ground fit with the adjacent portion of said bonnet.

3. A gland comprising a bonnet having an internal shoulder provided with a seat, a spool-shaped body having the lower end thereof flared and having a ground fit with said seat, a valve stem having a head engaging said spool-shaped body and having the periphery thereof beveled, a combined retainer and seat for said head, said combined retainer and seat being threaded into the lower portion of said bonnet, said spool-shaped body being provided with a socket, a spring in said socket and urging said spool-shaped body into fluid tight contact with said combined shoulder and seat and urging said head into fluid tight contact with said combined retainer and seat, an operating member having a stem extending through the top of said bonnet and having an annular shoulder provided with a ground fit with the adjacent portion of said bonnet, and a spring confined between said annular shoulder and said spool-shaped body.

4. A gland comprising a bonnet having an internal shoulder provided with a seat, a spool-shaped body having the lower end thereof flared and having a ground fit with said seat, a valve stem having a head engaging said spool-shaped body and having the periphery thereof beveled, a combined retainer and seat for said head, said combined retainer and seat being threaded into the lower portion of said bonnet, said spool-shaped body being provided with a socket, a spring in said socket and urging said spool-shaped body into fluid tight contact with said combined shoulder and seat and urging said head into fluid tight contact with said combined retainer and seat, an operating member having a stem extending through the top of said bonnet and having an annular shoulder provided with a ground fit with the adjacent portion of said bonnet, and a spring confined between said annular shoulder and said spool-shaped body, the lower portion of said operating stem being squared and the upper portion of said spool-shaped body being provided with a squared socket slidably receiving the squared lower portion of said operating stem.

In testimony whereof I affix my signature.

JOSEPH S. WILLIAMS.